United States Patent [19]

Clements et al.

[11] Patent Number: 5,746,792
[45] Date of Patent: May 5, 1998

[54] DUST COLLECTOR FILTER ELEMENT AND SUPPORTING STRUCTURE

[75] Inventors: Jack T. Clements, Lee's Summit, Mo.; Anthony J. Thill, Prairie Village; Ronald L. Mahoney, Fairway, both of Kans.

[73] Assignee: BHA Group Holdings, Inc., Kansas City, Mo.

[21] Appl. No.: 738,098

[22] Filed: Oct. 25, 1996

[51] Int. Cl.⁶ .................................................. B01D 29/17
[52] U.S. Cl. ..................... 55/341.1; 55/378; 55/DIG. 26
[58] Field of Search .......................... 55/379, 497, 500, 55/521, 369, 302, 373–378, 381, 382, 341.1–341.7, DIG. 26

[56] References Cited

U.S. PATENT DOCUMENTS

| | | | |
|---|---|---|---|
| 1,012,122 | 12/1911 | Budil | 55/341.7 |
| 1,847,368 | 5/1932 | Wendler | 95/268 |
| 2,308,309 | 1/1943 | Ruemelin et al. | 55/377 |
| 2,335,315 | 11/1943 | Seymour | 55/305 |
| 2,503,568 | 4/1950 | Timm | 55/300 |
| 2,927,659 | 3/1960 | Pabst et al. | 55/234 |
| 2,952,332 | 9/1960 | Metro | 55/341.2 X |
| 2,981,368 | 4/1961 | Johnson | 55/379 |
| 3,167,415 | 1/1965 | Edwards | 55/302 |
| 3,421,295 | 1/1969 | Swift et al. | 55/302 |
| 3,524,304 | 8/1970 | Wittemeier et al. | 55/374 |
| 3,550,359 | 12/1970 | Fisher et al. | 55/379 X |
| 3,716,436 | 2/1973 | Pall et al. | 55/498 X |
| 3,747,605 | 7/1973 | O'Dell et al. | 55/381 X |
| 3,765,152 | 10/1973 | Pausch | 55/302 X |
| 3,774,458 | 11/1973 | Kitai et al. | 74/2 |
| 3,774,769 | 11/1973 | Smith | 55/373 X |
| 3,791,111 | 2/1974 | Kroll | 55/379 X |
| 3,826,066 | 7/1974 | Higgins | 55/379 |
| 3,830,042 | 8/1974 | MacDonnell | 55/379 X |
| 3,837,151 | 9/1974 | Jensen | 55/378 X |
| 3,853,509 | 12/1974 | Leliaert | 55/378 X |
| 3,856,489 | 12/1974 | Vokraz | 55/379 |
| 3,876,402 | 4/1975 | Bundy et al. | 55/379 X |
| 3,942,962 | 3/1976 | Duyckinck | 55/302 |
| 4,073,632 | 2/1978 | Reinauer et al. | 55/374 |

(List continued on next page.)

FOREIGN PATENT DOCUMENTS

| | | |
|---|---|---|
| 0160168 | 11/1985 | European Pat. Off. . |
| 0213930 | 3/1987 | European Pat. Off. . |
| 0520737 | 12/1992 | European Pat. Off. . |
| 48891 | 10/1889 | Germany . |
| 1191078 | 4/1965 | Germany . |
| 242388 | 11/1925 | United Kingdom . |
| 636439 | 4/1950 | United Kingdom . |
| 840570 | 7/1960 | United Kingdom . |
| 990587 | 4/1965 | United Kingdom . |
| 1016556 | 1/1966 | United Kingdom . |
| 1081516 | 8/1967 | United Kingdom . |
| 8505286 | 12/1985 | WIPO . |

Primary Examiner—Richard L. Chiesa
Attorney, Agent, or Firm—Kokjer, Kircher, Bowman & Johnson

[57] ABSTRACT

A filter and support structure, for a baghouse having a tube sheet with a plurality of apertures, has a filter media wrapped around a core. An end cap is joined proximate the top of the core and has a rim extending over the filter media. The rim of the end cap is joined with a collar having a downwardly depending annular barrel. The barrel has a pair of outwardly protruding ribs. A snap band assembly has a metallic snap band, spring-biased outwardly, and covered with fabric. The snap band assembly has upper and lower outwardly protruding portions. The snap band assembly receives a periphery of a tube sheet aperture between the upper and lower outwardly protruding portions. The upper rib of the pair engages with the inner face of the snap band assembly proximate the plane in which the tube sheet lies, or slightly below that plane. The collar has a flat upper portion which is spatially removed from the snap band assembly and a downwardly depending annular flange which engages with the top of the tube sheet. A plurality of cutaway areas are spaced around the flange for receiving a pry bar.

11 Claims, 3 Drawing Sheets

U.S. PATENT DOCUMENTS

| | | | |
|---|---|---|---|
| 4,138,234 | 2/1979 | Kubesa | 55/379 |
| 4,187,091 | 2/1980 | Durre et al. | 55/499 |
| 4,218,227 | 8/1980 | Frey | 55/302 |
| 4,247,314 | 1/1981 | Smoluchowski et al. | 55/304 |
| 4,256,473 | 3/1981 | De Martino | 55/505 X |
| 4,270,935 | 6/1981 | Reinauer | 55/302 X |
| 4,272,263 | 6/1981 | Hancock | 55/379 |
| 4,276,069 | 6/1981 | Miller | 55/379 |
| 4,291,904 | 9/1981 | Iversen et al. | 55/378 X |
| 4,292,057 | 9/1981 | Ulvestad et al. | 55/302 |
| 4,319,897 | 3/1982 | Labadie | 55/302 |
| 4,322,231 | 3/1982 | Hilzendeger et al. | 55/357 |
| 4,344,781 | 8/1982 | Higgins et al. | 55/379 |
| 4,424,070 | 1/1984 | Robinson | 55/378 |
| 4,436,536 | 3/1984 | Robinson | 55/379 X |
| 4,443,237 | 4/1984 | Ulvestad | 55/379 |
| 4,445,915 | 5/1984 | Robinson | 55/379 |
| 4,560,477 | 12/1985 | Moldow | 55/498 X |
| 4,632,680 | 12/1986 | Klimczak | 55/302 |
| 4,663,041 | 5/1987 | Miyagi et al. | 55/500 X |
| 4,732,678 | 3/1988 | Humbert, Jr. | 55/498 X |
| 4,813,985 | 3/1989 | Brennecke et al. | 55/378 |
| 4,878,930 | 11/1989 | Manniso et al. | 55/493 |
| 4,929,354 | 5/1990 | Meyering et al. | 210/321.61 |
| 4,954,255 | 9/1990 | Muller et al. | 55/501 X |
| 5,074,896 | 12/1991 | Baert et al. | 55/341.6 |
| 5,207,811 | 5/1993 | Buonpastore | 55/498 |
| 5,207,812 | 5/1993 | Tronto et al. | 55/498 |
| 5,211,846 | 5/1993 | Kott et al. | 55/492 X |
| 5,222,488 | 6/1993 | Forsgren | 55/497 X |
| 5,290,441 | 3/1994 | Griffin et al. | 55/379 |
| 5,290,446 | 3/1994 | Degen et al. | 55/486 X |
| 5,308,369 | 5/1994 | Morton et al. | 55/379 |
| 5,336,405 | 8/1994 | Tang et al. | 55/500 X |

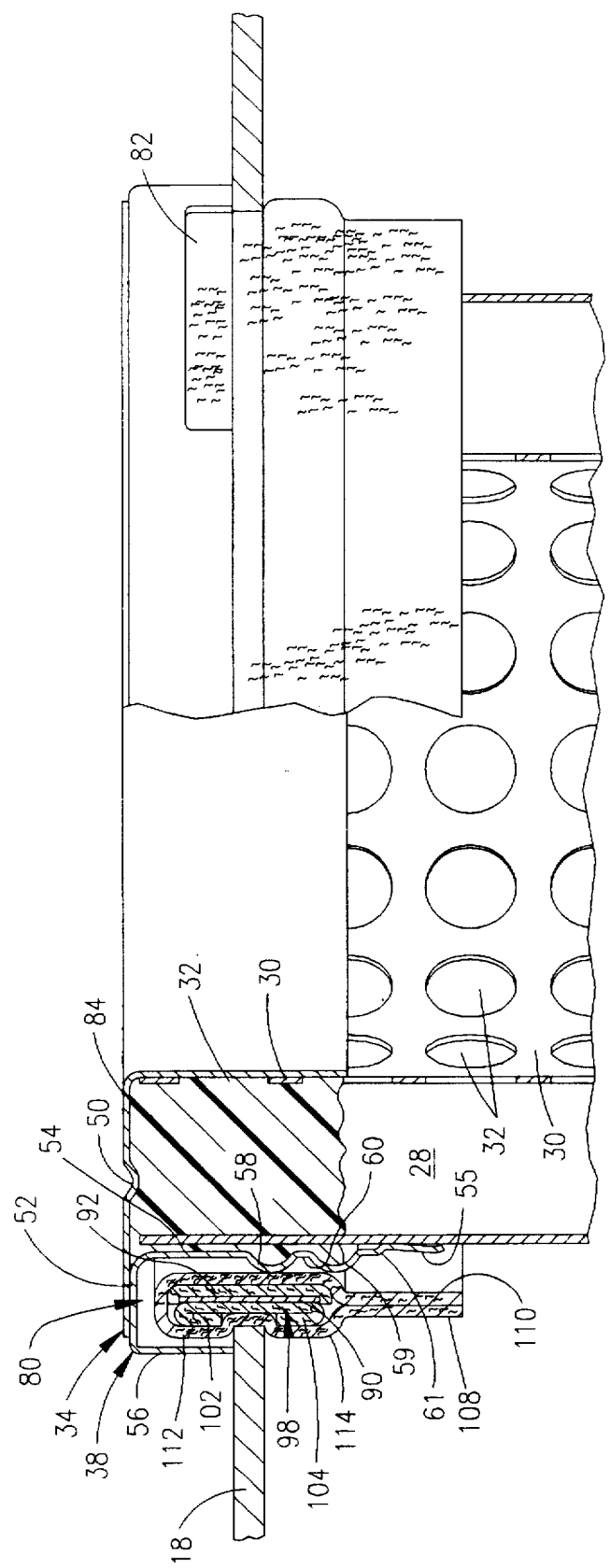

1

DUST COLLECTOR FILTER ELEMENT AND SUPPORTING STRUCTURE

BACKGROUND OF THE INVENTION

1. Field of the Invention

The present invention is directed to a baghouse filter device. Particularly, the present invention is directed to a filter element and its support structure for use in a dust collector, such as a baghouse.

2. Description of the Related Art

Baghouses for filtering particulate-laden air are well known. Conventional baghouses have a large housing with an upper, clean air chamber and a lower, dirty air chamber. The two chambers are separated by a sheet of metal, commonly referred to as a tube sheet or cell plate. The tube sheet has a number of openings therein from which cylindrical filters, such as bags or cartridges, are aligned. The filters suspend downwardly from the tube sheet openings into the dirty air chamber. Particulate-laden air is introduced into the dirty air chamber, and the particulates collect onto the filters. The filtered air passes through the filters to the interior of the filters, and upwardly out through the openings in the tube sheet into the clean air chamber. From the clean air chamber, the cleaned air is exhausted into the environment, or recirculated for other uses.

A principal objective in the design of a baghouse, and more particularly in the design of a filter bag or cartridge and its support structure, is that a seal exist between each filter element and the tube sheet. Otherwise, in the absence of a seal, particulate-laden air will seep around the filter element, through the tube sheet aperture, and into the clean air chamber, thereby contaminating the clean air. Additionally, because the filter elements require periodic replacement, it is important that the filter elements are easily removable and replaceable.

Numerous attempts have been made to develop a baghouse filter element and supporting structure for attaching a filter element to a baghouse tube sheet. U.S. Pat. No. 4,292,057 (Ulvestad et al.), U.S. Pat No. 4,424,070 (Robinson), U.S. Pat. No. 4,436,536 (Robinson), U.S. Pat. No. 4,443,237 (Ulvestad), and U.S. Pat. No. 4,445,915 (Robinson) are representative examples of prior art filter elements and attachment structure. As illustrated in the foregoing patents, many prior art filters and support structure utilize a flexible gasket for sealing the filter with the tube sheet.

Prior art filter elements and associated structure for attaching the filter elements to a baghouse tube sheet tend to be complex, thus adding to the cost of the filter element and the overall baghouse. Additionally, prior art filter elements have not been altogether satisfactory in preventing particulate-laden air from seeping from the dirty air chamber, through the tube sheet aperture, and into the clean air chamber. Furthermore, the mounting and sealing of filter elements within a baghouse tube sheet remains one of the most time-consuming and expensive fabrication operations in the manufacture of baghouses and in the replacement of filter elements, in spite of prior art attempts at solving that problem.

Prior art filters and their support structure also present problems when the filters require replacement. In this regard, it is common for workers to walk on the upper surface of the tube sheet, and even on the top of the filter support structures, during periodic checking or replacement of the filters. It has been found that, walking on the tube sheet and filter support structures often causes the sealing arrangements to deform or contort, thus breaking its seal with the tube sheet and resulting in poor particulate collection efficiency during operation of the baghouse.

Accordingly, the need exists for a filter and supporting structure which is inexpensive to manufacture and easy to install and replace in a baghouse. Additionally, the need exists for a filter element, such as a cartridge or bag, and supporting structure which provides a reliable seal between the filter element and the tube sheet from which it is suspended, even when loads are applied to the top of the tube sheet and support structure. The present invention fills these and other needs, and overcomes the drawbacks of the prior art.

SUMMARY OF THE INVENTION

It is an object of the present invention to reliably seal a filter element with a baghouse tube sheet.

It is an object of the present invention to provide a filter element for a baghouse which is inexpensive and easy to manufacture and replace.

It is an object of the present invention to prevent distortion of support structure for a filter element in a dust collector; even when pressure or a load is applied to the top of the filter element or support structure.

These and other objects are achieved by a filter, for use in a dust collector, and its unique support structure. The filter has a filter media, such as a bag or pleated filter cartridge, surrounding a cylindrical core. The core is a perforated sleeve or cage. An annular upper end cap, having an annular inner wall which fits within an open upper end of the cylindrical core, is joined with the core. The end cap has a substantially flat upper surface which extends outwardly over, and beyond the outer edge of, an upper portion of the filter media.

The filter is supported within an aperture in a baghouse tube sheet by the combination of a unique metallic, annular collar and a flexible annular snap band assembly. The integrally-formed collar has a flat upper portion. An annular barrel extends downwardly from an inside edge of the flat upper portion. The outer edge of the flat upper portion is bent downwardly to form a downwardly depending, outer flange portion. The barrel extends downwardly lower than the flange and has a pair of ribs facing outwardly therefrom.

The flexible annular snap band assembly has a metallic snap band, spring-biased outwardly, that is covered with fabric. Particularly, the metallic snap band has an inner surface and an outer surface, each of which is covered by a fabric strip. The outer fabric strip has a central portion adhered to the outer surface of the metallic snap band, and upper and lower portions folded outwardly into engagement with the central portion, thereby forming upper and lower outwardly protruding portions. A fabric sleeve is positioned about the combination of the snap band and outer fabric layers.

The snap band assembly receives a periphery of a tube sheet aperture between the upper and lower outwardly protruding portions. The upper rib on the collar engages with the inner face of the snap band assembly, proximate the plane in which the tube sheet lies, or slightly below that plane. The lower rib on the collar engages with the inner face of the snap band assembly proximate a lower edge of the snap band.

The snap band assembly is installed into an opening of a tube sheet by kidneying the snap band assembly and placing it within the opening, and releasing it, thereby allowing it to snap outwardly into engagement with the periphery of the tube sheet opening. The outwardly biased force, caused by the snap band, causes the snap band assembly to sealingly engage in the tube sheet. The end cap is secured to the collar by welding or otherwise securing the substantially flat upper surface of the end cap to the substantially flat upper portion of the collar. The upper end of the filter element, which, as stated, is formed by wrapping the filter media about the core, is secured to the end cap by a potting compound. The filter media is then placed downwardly through the tube sheet aperture, such that the barrel of the collar is force fit into the aperture into engagement with an inner face of the snap band assembly. Particularly, the upper rib of the barrel engages with an inner face of the snap band assembly substantially at the plane of the tube sheet, or slightly below. The lowermost outwardly protruding rib on the collar engages in an inner face of the snap band assembly proximate a lower edge of the snap band.

The flat upper portion of the collar is spacially removed from the snap band assembly and the downwardly depending annular flange engages with the top of the tube sheet. Thus, the rim of the collar transmits the load of the filter, as well as any other loads applied downwardly to the collar or end cap, directly into the tube sheet. Spaced openings are provided in the downwardly depending flange of the collar for receiving a pry bar during removal of the filter.

BRIEF DESCRIPTION OF THE DRAWINGS

The objects and features of the invention noted above are explained in more detail with reference to the drawings, in which like reference numerals denote like elements, and in which:

FIG. 4 is cross-sectional view of a filter and attachment structure therefor in accordance with the present invention, shown in sealed relationship with a baghouse tube sheet.

DETAILED DESCRIPTION OF THE INVENTION

Figure 1:
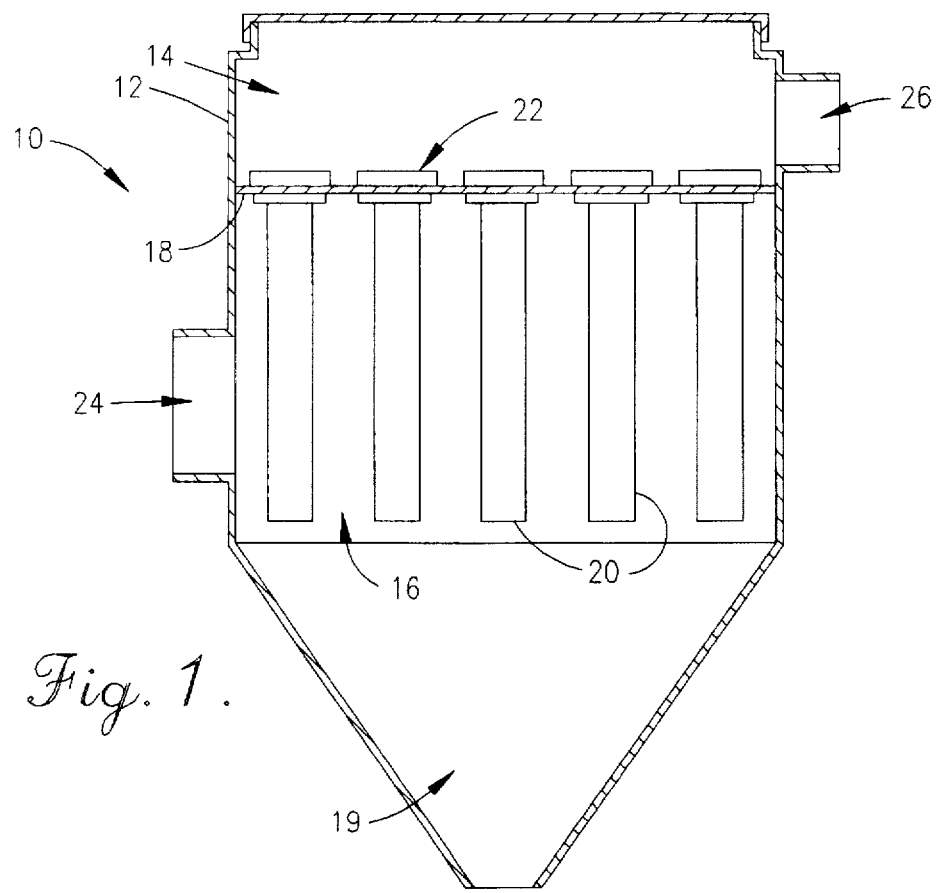
FIG. 1 is a diagrammatic view of a dust collector of the present invention.

With reference initially to FIG. 1, a dust collector (also referred to as a baghouse) of the present invention is denoted generally by reference numeral 10. Dust collector 10 is formed generally of a housing 12 separated into upper and lower chambers 14, 16 respectively, by a tube sheet 18. The dust collector 10 has a dust collection hopper 19 at its bottom portion. A plurality of filter elements 20 are suspended from tube sheet 18 into the lower chamber 16, and are held in place by attachment structure, denoted generally by reference numeral 22 in FIG. 1. An inlet 24 communicates with lower chamber 16 and an outlet 26 communicates with upper chamber 14.

The structure and operation of baghouse 10 will be readily appreciated by those with skill in the art. Described briefly, particulate-laden air is introduced into lower chamber 16 through inlet 24. The particulates collect onto filter elements 20, and the cleaned air exits out through the interior of the filters, upwardly through apertures in the tube sheet, and into the clean air chamber 14 where it is exhausted through outlet 26.

Figure 3:
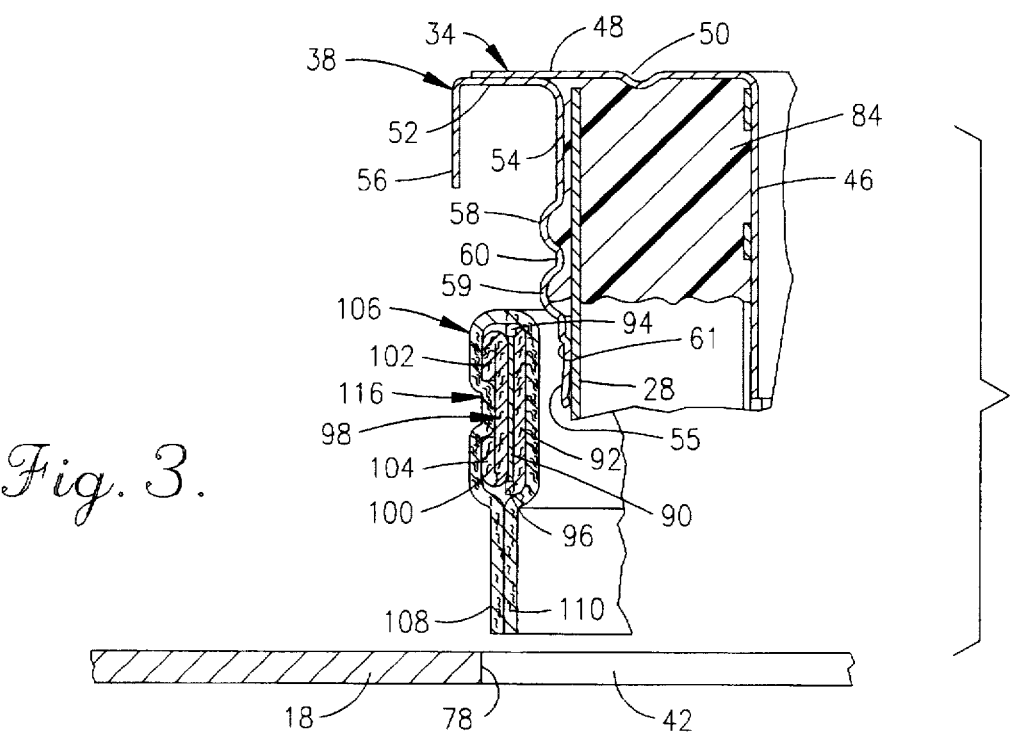
FIG. 3 is an enlarged, fragmentary cross-sectional view of the filter and attachment structure of the present invention.
Figure 2:
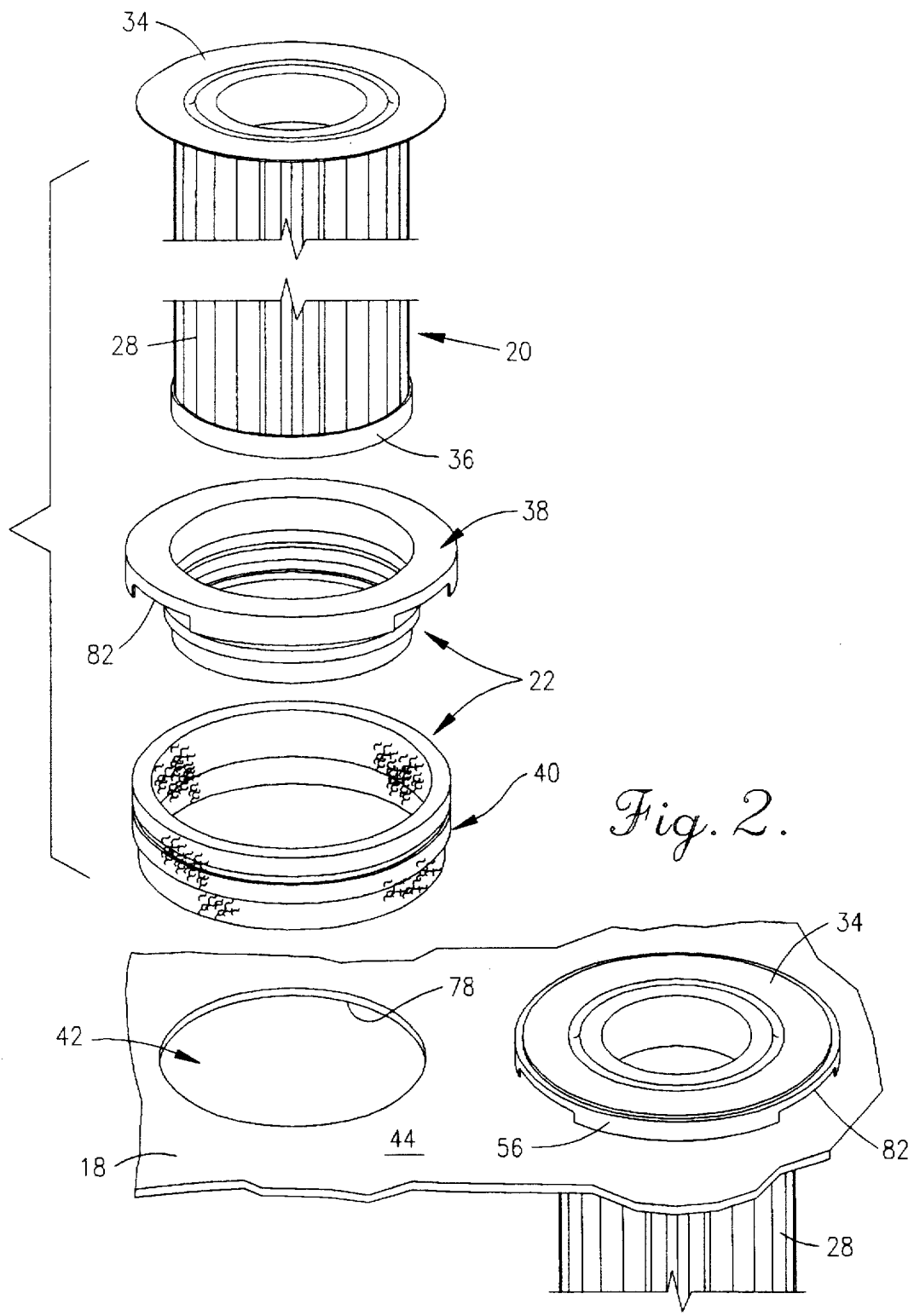
FIG. 2 is a fragmentary view, in perspective, illustrating a filter and attachment structure of the present invention in exploded form.

With reference now to FIGS. 2–4, the filter element 20 and its support structure 22 of the present invention are described in detail.

Filter element 20 is formed of filtering media 28 wrapped around a core 30. Filtering media 28 may be made of any suitable fabric or material, such as those materials commonly used to make filtering bags or pleated cartridges. As shown, filtering media 28 is a pleated filter cartridge. Core 30 has a number of perforations, or apertures, 32 therein. It will be appreciated that core 30, shown as a perforated sleeve, may be substituted with a cage as is commonly used in conjunction with filter bags. In this regard, the term core is meant to encompass any conventional element upon which filter media is wrapped and through which air may flow, such as a perforated sleeve or a cage. Filter element 20 has an upper end cap 34, preferably formed of metal, and a lower end cap, support band, or potted bottom 36. As shown, the filter cartridge is potted into the end cap by a potting compound 84, such as an epoxy, ceramic, silicone, or urethane composition. The construction of filters will be readily understood by those skilled in the art. The preferred filter illustrated could be substituted with other suitable filter styles.

Support structure 22 includes an annular collar 38 and an annular flexible snap band assembly 40. As shown in FIG. 2, cylindrical filter element 20 is positioned downwardly through annular collar 38, snap band assembly 40, and an aperture 42 in tube sheet 18, until a portion of the collar 38 rests on an upper side surface 44 in tube sheet 18, as described in detail below.

With reference now specifically to FIGS. 3 and 4, upper end cap 34 has a downwardly depending annular inner wall portion 46 and a substantially flat, annular upper portion 48 extending outwardly from an upper edge of annular wall 46. Annular upper surface 48 of upper end cap 34 has an annular groove 50 therein, the bottom side of which engages with filtering media 28, as shown. Collar 38, preferably formed of metal, is integrally formed and has an upper, flat portion 52, an inner, annular barrel portion 54 extending downwardly from upper portion 52, and an outer annular downwardly depending flange portion 56. Barrel 54 forms upper and lower outwardly protruding annular ribs 58, 59 separated by a channel 60. A lowermost portion of barrel portion 54, beneath the lower-most rib 59, is bent inwardly (at 61) to form a rim 55 which engages with filtering media 28.

Annular flexible snap band assembly 40 is preferably formed by the metallic snap band, or ring, designated by reference numeral 90. A first strip of fabric, denoted generally by reference numeral 92, is adhesively secured to an inner face of the snap band 90. As shown, the first piece of fabric 92 has upper and lower ends, 94, 96, respectively, folded about the upper and lower ends of snap band 90. A second strip of fabric, denoted generally by reference numeral 98, and being of a greater width than the first strip of fabric 92, has a primary, central portion 100 adhesively secured to an outer face of the snap band 90. As shown, upper and lower ends 102, 104, respectively, of the second strip 98 of fabric are folded away from the snap band 90 and into engagement with the major central portion 100 of the second strip of fabric 98. The upper and lower, folded ends 102, 104 are secured to the central portion 100 in any suitable manner, such as sewing or by an adhesive. The upper and lower portions 102, 104, when folded, terminate so as to leave a space therebetween, as shown. A fabric jacket, or sleeve, denoted by reference numeral 106 is positioned about the snap band 90, and the first and second fabric strips 92, 98. Lower depending portions 108, 110 of the sleeve 106 are secured together in a suitable manner, such as by sewing, or an adhesive. It will be understood and appreciated that the fabric used in the manufacture of the snap band assembly may be any suitable fabric, such as woven cloth or felt. It will also be understood that the described snap band assembly could be substituted with other snap band assembly configurations.

As described and shown, flexible, annular snap band assembly 40, when completed, has outwardly protruding upper and lower portions 112, 114 formed by upper and lower folded portions 102, 104 of the second, outer strip of fabric 98. The outwardly protruding portions 112, 114 are separated by an annular groove 116 surrounding the snap band assembly 40.

Assembly and installation of filter 20 and support structure 22 are now described.

Core 30 is spot welded to annular wall 46 of upper end cap 34. Upper surface 48 of end cap 34 is then put into position with the upper flat portion 52 of collar 38, and the two are joined, such as by spot welding. Molding compound 84 is then placed into the recessed formed by the attached end cap 34 and collar 38, and filter media 28 is wrapped about core 30 with an upper end thereof being potted within the potting compound. Potting compound 84 is allowed to cure. Additionally, the bottom of filter media 28 and core 30 is potted into molding compound to form bottom 36.

Flexible snap band assembly 40 is positioned into an aperture 42 in tube sheet 18 by kidneying, or inwardly flexing, the snap band assembly, positioning it within the aperture 42, and then releasing the kidneying pressure to allow the snap band to resiliently bias radially outward into engagement with the periphery of the aperture 42. Specifically, the flexible snap band assembly 40 is positioned into aperture 42 such that the outwardly facing annular groove 116 mates with a peripheral edge 78 of the aperture 42. During this stage, the snap band assembly 40 forms a seal with the peripheral edge 78 of the tube sheet aperture 42. The barrel portion 54 of collar 38 is then pressed downwardly into the annular, flexible snap band assembly 40 until the outwardly protruding ribs 58, 59 on barrel 54 of collar 38 are in the position shown in FIG. 4. Preferably, the uppermost outwardly protruding rib 58 engages with an interior surface of snap band assembly 40 at a location that is substantially at, or slightly lower than, the plane of the tube sheet. The lowermost outwardly protruding rib 59 preferably engages the inner face of the snap band assembly 40 proximate a lower end of the snap band 90.

When barrel 54 is inserted into snap band assembly 40, the snap band assembly 40 is sealingly compressed between barrel 54 (and particularly ribs 58, 59 thereof), and peripheral edge 78 of the tube sheet aperture 42. This causes the groove 116 in the assembly 40 to further compress against the peripheral edge 78, thereby enhancing the seal between snap band assembly 40 and the tube sheet 18.

As shown in FIG. 4, the dimensions of collar 38 and snap band assembly 40 are such that, when barrel 54 is properly positioned within the snap band assembly 40, the downwardly depending flange 56 of collar 38 rests on the upper surface 44 of tube sheet 18. This is highly desirable because loads applied to the top of the assembly, such as when workers are walking thereon, are transmitted downwardly into the tube sheet 18 and do not effect the seal established by the snap band assembly 40. Additionally, in the operative position, as shown in FIG. 4, a space 80 is provided between upper portion 52 of collar 38 and the top of snap band assembly 40. Space 80 further assures that loads applied to collar 38 are not transmitted to the top of assembly 40. Openings, such as cutaways 82, are spaced about collar 38 in downwardly depending flange 56. These cutaways 82 provide a pry surface for receiving a crowbar or like object used to pry the filters 20 from there sealed position within the tube sheet 18.

The present invention is highly useful for providing an effective dust-tight seal between a filter and baghouse tube sheet. During operation of a dust collector employing the present invention, filters 20 filter particulate-laden air such that the particulates deposit on the filtering media 28. The cleaned air passes through the perforations 32 of the core 30 to the interior of core 30, where it is drawn upwardly out through the tube sheet apertures 42 and into the clean air chamber 14. During this operation, the present invention, and namely the seal formed by the combination of collar 38 and snap band assembly 40, prevents particulate-laden air from seeping between the assembly 40 and tube sheet 18 or the assembly 40 and barrel 54. Particularly, the position of the pair of outwardly protruding ribs 58, 59 on barrel 54 of collar 38 has been found to assist in forming an extremely effective dust tight seal. The present invention is also easy to manufacture, install, and replace, is especially adapted for high temperature operations due to the materials selected, and may be subjected to loads which will not cause the seal to be broken.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A filter device, for use in a baghouse particulate collector having a tube sheet with a plurality of apertures therein, said filter device comprising:

a core;

a filter media positioned about said core;

an upper end cap positioned at an upper end of said core and having an annular rim extending over the top of said filter media;

an annular collar having a downwardly depending annular barrel, said barrel having an upper and a lower outwardly protruding rim, said upper end cap being secured to said annular collar;

a flexible, annular snap band assembly biased radially outwardly and having an inner face and outer face, said outer face having upper and lower outwardly protruding portions separated by an annular groove, wherein said annular groove sealingly receives a peripheral edge of one of said tube sheet apertures, and wherein said barrel of said collar is positioned into said annular snap band assembly such that said upper and lower outwardly protruding rims of said barrel engage said inner face of said snap band assembly, said upper outwardly protruding rim engaging said inner face at a location slightly beneath a plane of said tube sheet.

2. A filter device as set forth in claim 1, wherein said snap band assembly includes a snap band.

3. The filter device as set forth in claim 1, wherein said snap band assembly comprises:

a flexible snap band having an inner face and an outer face;

a first strip of fabric engaging said inner face of said snap band;

a second strip of fabric having a central portion engaged with said outer face of said snap band and upper and lower portions folded outwardly into engagement with said central portion, thereby forming said upper and lower outwardly protruding portions of said snap band assembly.

4. The filter device as set forth in claim 3, wherein said snap band assembly further comprises a sleeve positioned about the combination of said snap band, said first strip of fabric, and said second strip of fabric.

5. The filter device as set forth in claim 1, wherein a lowermost portion of said barrel of said collar bends inwardly into engagement with said filter media.

6. The filter device as set forth in claim 1, wherein said collar has an upper, substantially flat portion having an inner edge and an outer edge, said collar further having a downwardly depending outer flange portion depending downwardly from said outer edge, wherein said upper rim portion of said collar overlies said snap band assembly in spaced relation, and wherein said downwardly depending outer flange of said collar engages with a top surface of said tube sheet.

7. The filter device as set forth in claim 6, wherein said downwardly depending flange of said collar has at least one cut-away portion for receiving a pry bar.

8. A baghouse for collecting particulate comprising:

an upper chamber and a lower chamber separated by a metallic sheet having a plurality of apertures therein;

a plurality of filters suspended, from said metallic sheet, into said lower chamber, each said filter having an upper end cap and being aligned with one of said apertures in said metallic sheet;

support structure for supporting each said filter from said metallic sheet, said support structure comprising:

an annular, flexible snap band assembly having upper and lower outwardly protruding portions separated by an annular groove for receiving a periphery of a respective one of said apertures in said metallic sheet; and a collar, secured to said end cap, said collar having a downwardly depending annular barrel sealingly inserted into said snap band assembly, wherein said barrel has upper and lower outwardly protruding rims, said upper rim pressed into engagement with an inner face of said snap band assembly at a location proximate a plane of said tube sheet, wherein said collar assists in compressing said snap band assembly into sealing engagement with said metallic sheet.

9. The baghouse as set forth in claim 8, wherein each said filter is further comprised of a filter media, and wherein the barrel of said collar has a lower portion bent inwardly into engagement with said filter media of said filter.

10. The baghouse as set forth in claim 8, wherein said collar further includes a flat upper portion and a downwardly depending outer flange, said flat upper portion of said collar being spacially removed from said snap band assembly, and said downwardly depending flange of said collar engaging a top surface of said metallic sheet.

11. The baghouse as set forth in claim 10, wherein said downwardly depending flange of said collar has at least one cut-away portion for receiving a pry bar.

* * * * *